United States Patent
Small et al.

(10) Patent No.: US 7,246,555 B2
(45) Date of Patent: Jul. 24, 2007

(54) PORTABLE VACUUM FOOD STORAGE SYSTEM

(75) Inventors: David B. Small, San Jose, CA (US); Pauls Rago, Danville, CA (US)

(73) Assignee: Shoot the Moon Products II, LLC, Pleasanton, CA (US)

( * ) Notice: Subject to any disclaimer, the term of this patent is extended or adjusted under 35 U.S.C. 154(b) by 581 days.

(21) Appl. No.: 10/388,105

(22) Filed: Mar. 12, 2003

(65) Prior Publication Data

US 2004/0177771 A1    Sep. 16, 2004

(51) Int. Cl.
B65D 51/16    (2006.01)
A23B 7/00    (2006.01)

(52) U.S. Cl. ............... 99/472; 99/646 C; 141/65; 215/262; 220/231

(58) Field of Classification Search ............ 99/472, 99/646 C; 141/198, 65, 96; 220/231, 212, 220/287, 202; 215/262, 260, 228, 309, 319, 215/270
See application file for complete search history.

(56) References Cited

U.S. PATENT DOCUMENTS

| | | | |
|---|---|---|---|
| 2,487,400 A | | 11/1949 | Tupper |
| 2,662,664 A | | 12/1953 | Decker |
| 3,655,089 A | * | 4/1972 | Tower ............... 220/287 |
| 3,980,226 A | | 9/1976 | Franz |
| 4,051,971 A | * | 10/1977 | Saleri et al. ............... 215/260 |
| 4,093,009 A | | 6/1978 | Iavarone et al. |
| 4,218,967 A | | 8/1980 | Batchelor |
| 4,222,276 A | | 9/1980 | DeRogatis |
| 4,287,819 A | | 9/1981 | Emerit |
| 4,471,880 A | | 9/1984 | Taylor et al. |
| 4,605,993 A | * | 8/1986 | Zelina, Jr. ............... 362/183 |
| 4,660,355 A | | 4/1987 | Kristen |
| 4,678,082 A | | 7/1987 | Fillmore |
| 4,818,550 A | | 4/1989 | Davidson |
| 4,901,634 A | | 2/1990 | Kuwahara et al. |
| 4,941,310 A | | 7/1990 | Kristen |
| 4,984,611 A | * | 1/1991 | Takatsuki et al. ............... 141/65 |
| 5,195,427 A | * | 3/1993 | Germano ............... 99/472 |
| 5,332,095 A | | 7/1994 | Wu |

(Continued)

OTHER PUBLICATIONS www.crockpot.com web pages re Seal-a-meal Vacuum Food Sealers, 2 pages. date unknown.

(Continued)

*Primary Examiner*—Reginald L. Alexander
(74) *Attorney, Agent, or Firm*—Blakely Sokoloff Taylor & Zafman LLP

(57) ABSTRACT

Portable Vacuum Food Storage System with a housing that contains a vacuum pump, an on off power switch, a vacuum pressure switch and a plurality of rechargeable DC batteries. The top of the housing has a gripping member help the user to twist and fasten the housing onto a mating container lid. The housing has a bayonet type fastener at its lower center portion that mates to a receptacle located on the lid, the lid has a vacuum releasing member that can be pressed by the user to relieve the vacuum in the container. The vacuum housing is capable of resting on the lid in a stable manner so that the vacuum operation can take place unattended by the user. The vacuum lid is capable of fitting on standard TupperWare or Rubber Maid containers.

9 Claims, 6 Drawing Sheets

U.S. PATENT DOCUMENTS

| | | |
|---|---|---|
| 5,390,809 A | 2/1995 | Lin |
| 5,406,992 A | 4/1995 | Miramon |
| RE34,929 E | 5/1995 | Kristen |
| 5,546,997 A | 8/1996 | Miramon |
| 5,655,357 A | 8/1997 | Kristen |
| 5,692,632 A | 12/1997 | Hsieh et al. |
| 5,695,086 A | 12/1997 | Viola |
| 5,806,575 A * | 9/1998 | Tsay ............................ 141/65 |
| 5,871,120 A | 2/1999 | Romero et al. |
| 6,058,998 A | 5/2000 | Kristen |
| 6,256,968 B1 | 7/2001 | Kristen |
| 6,316,911 B1 * | 11/2001 | Moskowitz et al. ........ 320/114 |
| 6,503,209 B2 * | 1/2003 | Hakky et al. ................ 600/573 |
| 6,652,251 B1 * | 11/2003 | Chen .......................... 417/411 |

OTHER PUBLICATIONS www.crockpot.com web pages re Seal-A-Meal Model #VS125-S and accessories, 3 pages. date unknown.

* cited by examiner

PORTABLE VACUUM FOOD STORAGE SYSTEM

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of vacuum producing appliances and more specifically to a portable vacuum food storage system.

The idea of using a vacuum to extend the useful live of various types of foods is well known.

A vacuum is routinely used in the canning process to remove oxygen that can otherwise cause mold or bacteria to build up inside a food can. More recently, vacuum producing devices have been marketed that remove air from plastic bags and containers so that the user can create their own long term vacuum food storage.

These devices are primarily designed for use with plastic bags where a food is inserted into the bag, the open end of the bag is placed in a vacuum producing device so that the air is removed from the bag and the device then heat seals the end of the bag to trap the vacuum inside the bag. A major manufacturer of such an appliance is the Tilia Corporation of San Francisco, Calif. Their device, known as "Food Saver" also can come with a hose attachment to mate with specially designed lids and associated containers.

Although the Food Saver system is effective, there are certain deficiencies that the present invention addresses. First, when the user of the Food Saver System attaches the vacuum hose to a container, he or she is forced to hold the hose until the vacuum is produced. This means that either the vacuum pump must be large enough to quickly produce a vacuum or, if a small vacuum pump is used, the user must wait patiently for the vacuum to be produced. Second, the Food Saver unit and others like it tend to be powered by household voltage and therefore are required to be in close proximity to an outlet. Thirdly, a separate lid must be used for each container having a different top dimension. Fourth, The Food Saver unit and others like it are designed for long term food storage. They use heavy walled polycarbonate containers to be able to store a vacuum for long periods because there is no provision to automatically recharge the vacuum of a less expensive thinner walled container such as a polyethylene container.

BRIEF SUMMARY OF THE INVENTION

The primary object of the invention is to provide a portable vacuum food storage system that provides a means to easily vacuumize plastic food containers.

Another object of the invention is to provide a vacuum food storage system that allows the user to produce a vacuum in a container without having to be present during the vacuum operation during the entire process.

Another object of the invention is to provide a vacuum food storage system whose lids work with standard Tupper Ware or Rubber Maid containers.

A further object of the invention is to provide a vacuum food storage system where the vacuum in the container can be easily released by the push of a button.

Yet another object of the invention is to provide a vacuum food storage system where one lid can seal a variety of sizes of containers.

Still yet another object of the invention is to provide a vacuum food storage system where the vacuum pump automatically turns off when the proper vacuum is reached.

Another object of the invention is to provide a vacuum food storage system where an audible sound is created in the lid of the vacuum container when the vacuum is reached.

Another object of the invention is to provide a vacuum food storage system where a visual indicator is placed in the lid that shows when a vacuum is present.

Another object of the invention is to provide a vacuum food storage system where the vacuum pump portion is portable and can be recharged after each use.

A further object of the invention is to provide a vacuum food storage system where the vacuum pump portion can remain with the container portion and can automatically recharge the vacuum in the container when the vacuum becomes reduced.

Other objects and advantages of the present invention will become apparent from the following descriptions, taken in connection with the accompanying drawings, wherein, by way of illustration and example, an embodiment of the present invention is disclosed.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

In accordance with a preferred embodiment of the invention, there is disclosed a Portable Vacuum Food Storage System comprising: a housing that contains a vacuum pump, an on off power switch, a vacuum pressure switch and a plurality of rechargeable DC batteries. The top of said housing having a gripping means to twist and fasten said housing onto a mating container lid. The housing having a commonly known attachment means at its lower center portion that mates to a receptacle located on said lid. Said lid having a vacuum releasing member that can be pressed by the user to relieve the vacuum in said container. Said vacuum housing capable of resting on said lid in a stable manner so that the vacuum operation can take place unattended by the user, and said vacuum lids capable of fitting in an air-tight manner on standard TupperWare or Rubber Maid base containers. Said vacuum seal and valves capable of being removed and replaced for cleaning purposes.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
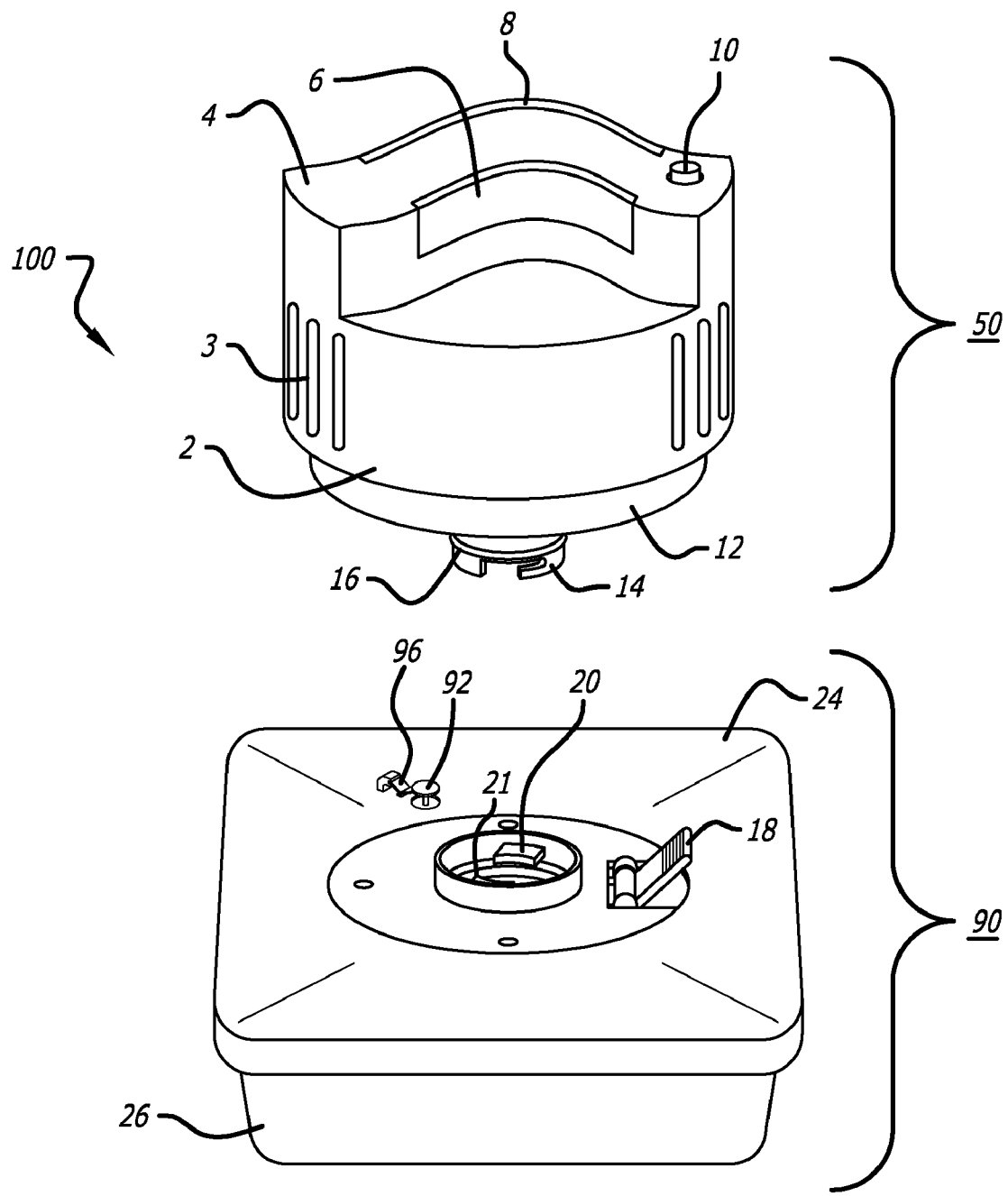
FIG. 1 is a perspective view of the invention.

Referring now to FIG. 1, a perspective view of a portable vacuum food storage system 100 is illustrated. The portable vacuum food storage system 100 is comprised of two main assemblies, the vacuum producing unit 50 and the vacuum storage container assembly 90. The vacuum producing unit 50 removably attaches to the lid 24 by a removable attachment means.

In one embodiment of the invention, the removable attachment means includes a standard bayonet type fitting 14 located on the bottom center of the vacuum producing unit 50, and the mating receptacle 42 and retaining teeth 20, 21 located in the center of the lid 24. An O ring 16 insures an air tight fit between the vacuum producing unit 50 and the lid assembly 90.

Figure 8:
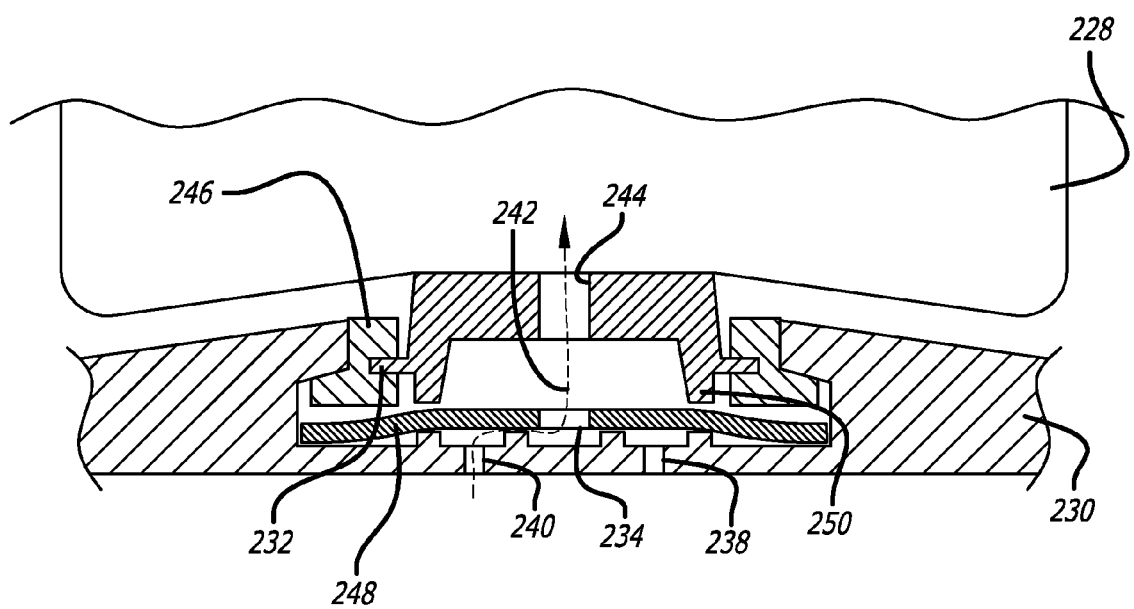
FIG. 8 is a partial section view of an alternate embodiment of the vacuum switch assembly.

Referring momentarily now to FIG. 8, an alternate embodiment of the invention is shown with a different removable attachment means. The vacuum housing 228 has a circular ring 250 that can impinge on a rubber disk 248 located in lid 230. Disk 248 has a central aperture 234 that allows evacuated air to pass from openings 240, 238, up into center aperture 244 located on the underside of vacuum housing 228 as shown by dotted line 242. Vacuum housing 228 locks onto lid 230 by means of a tongue and groove fastening joint 232, 246. Retaining ring 246 can be removed and replaced so that the user can clean the rubber disk 248 when necessary.

Referring now back to FIG. 1, a container portion 26 attaches to lid 24 in an air tight manner so that when a vacuum is pulled by the vacuum producing unit 50 it creates a vacuum in the vacuum storage container assembly 90. After the vacuum is achieved, the vacuum producing unit 50 can be easily removed and the container assembly 90 can be stored in a refrigerator or other remote location.

The base of the vacuum producing unit 50 rests completely on the top center surface 22 of lid 24 so that the vacuum operation can take place unattended by the user after the user activates the unit 50 by pushing "on" switch button 10. The top of the vacuum producing unit 50 has a curved raised portion 4 making it easy for the user to grab the top portion 4 and twist it a quarter of a turn to engage or disengage the vacuum producing unit 50 from the lid 24. A rubberized cushion 6, 8 makes the gripping and twisting action even more secure. Vertical ribs 3 allow the user to grip the entire diameter of the housing 2 to provide an additional method of twisting and removing or replacing the vacuum producing unit.

Figure 2:
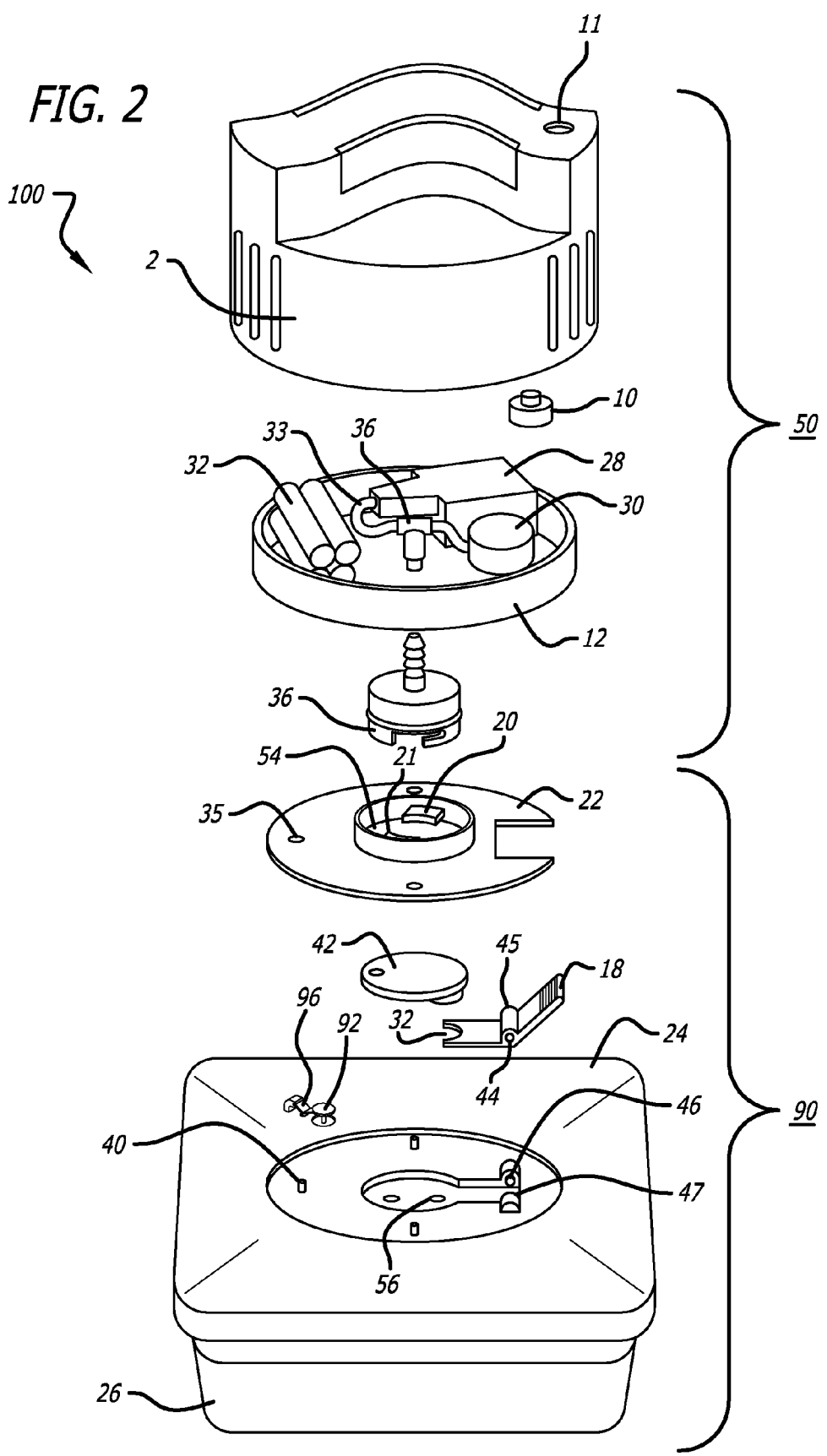
FIG. 2 is an exploded view of the invention.

Referring now to FIG. 2, an exploded view of the invention is illustrated. The vacuum housing 2 is comprised of a top cover 11 and a bottom cover 12. Enclosed within the vacuum housing 2 are a vacuum pump 28, an on-off switch 10, a vacuum switch 30, and a plurality of batteries 32. The vacuum pump 28 is connected to the fitting 36 via hose 33. T fitting 35 also connects vacuum hose 33 to fitting 36.

When a user presses the on-off switch 10 to the "on" position, the vacuum pump starts and continues to operate until the proper vacuum is reached and the vacuum switch 30 automatically turns off the vacuum pump 28. This feature has two benefits. One is that the user does not have to stand and wait for the vacuum to reach its desired strength and therefore can do other things while the vacuum is being produced. This means that it is not necessary to use a powerful and expensive vacuum pump for the purpose of producing a vacuum quickly because the user is not inconvenienced by the waiting period. Second, because the vacuum sensing switch 30 automatically turns off the vacuum, the user can decide to leave the vacuum producing unit 50 on the lid 24 indefinitely and when the vacuum inside container 26 becomes depleted, it can automatically be replenished by the vacuum sensing switch 30 automatically turning on the vacuum pump 28. The advantage here is that the container 26 can be constructed of inexpensive materials such as polyethylene. In the past, vacuum containers had to be manufactured from heavy walled expensive materials such as polycarbonate because they held the vacuum for longer periods. But, if the vacuum can be automatically replenished as needed, less expensive thin walled containers can be used. The lid assembly 90 is comprised of a main lid 24, rubber flap 42, vacuum release lever 18, and top plate 22.

The top plate 24 has a pair of teeth 20, 21 that interact with bayonet bottom 36 located on pump housing bottom 12. Main lid portion 24 has a recessed portion 54 that includes a through hole 56. The depression 54 also has an elongated portion that can retain vacuum release lever 18. Vacuum release lever 18 is pinned to a fulcrum portion in lid 24 by pins 46, 47 and receptacles 44, 45. Rubber flap 42 is placed on top of release lever 18 so that when lever 18 is pushed down by the user, flap 42 lifts off vacuum hole 56 thereby breaking the vacuum. Cover plate 22 is fixedly attached to lid 24 by pins 40 engaging with apertures 38 and being ultrasonically welded or the like. In the embodiment shown, O ring 36 interfaces with plastic ring 54 making an air tight seal. A alternate embodiment for the seal portion can be seen in FIG. 8 and has been described previously in this description.

Figure 3:
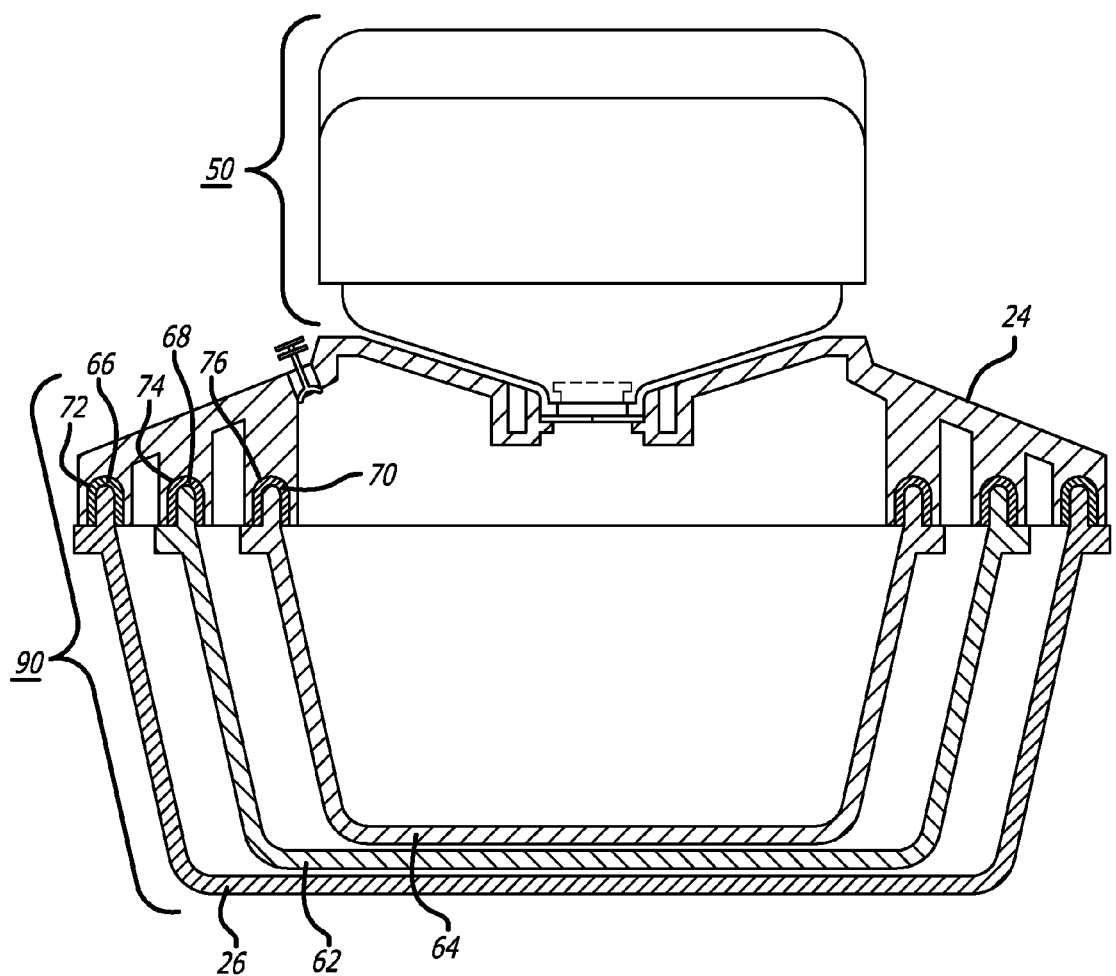
FIG. 3 is a side section view of the invention.

Referring now to FIG. 3, a side cross-sectional view of an embodiment of the invention is illustrated. In this view it can be seen that the lid 24 can have a plurality of retaining means so that a plurality of different sized containers 26, 62, 64 can be attached to the same lid 24. Rubber gaskets 66, 68, 70 are inserted into inverted U shaped cavities 72, 74, 76 and the top lips of the containers 26, 62, 64 fit snuggly into the gaskets so that a vacuum can be held. This configuration allows the user to choose what sized container to use and have one lid size to accommodate different sized containers. The Gasket portions can be sized to fit standard TupperWare or Rubber Maid containers, or specially sized containers can be sold with the lids.

Figure 4:
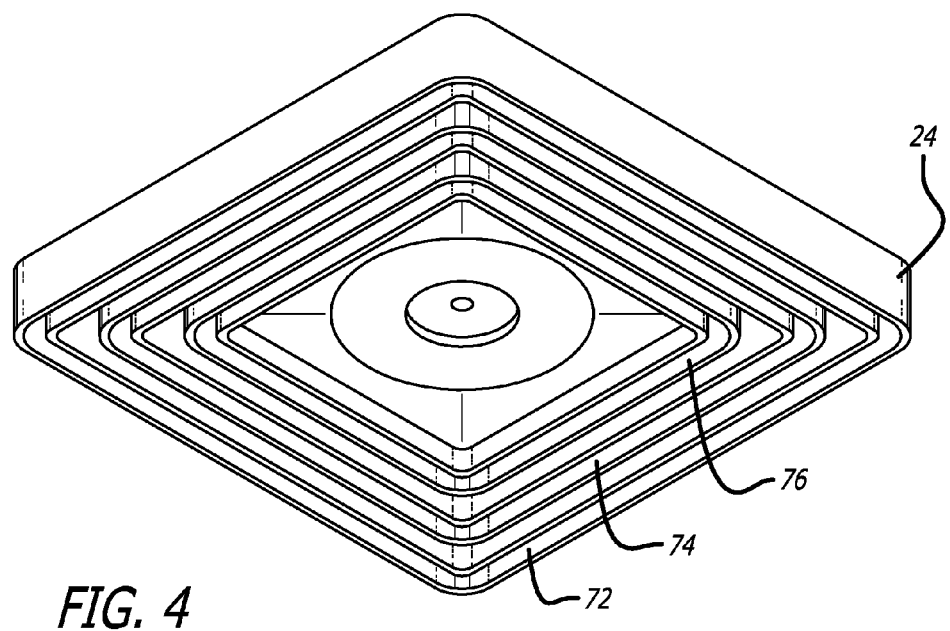
FIG. 4 is an underside view of the lid of the invention

FIG. 4 shows a clear view of the underside of lid 24 showing the concentric grooved retaining portions 72, 74, 76 that can retain a plurality of matching container bottoms.

Figure 5:
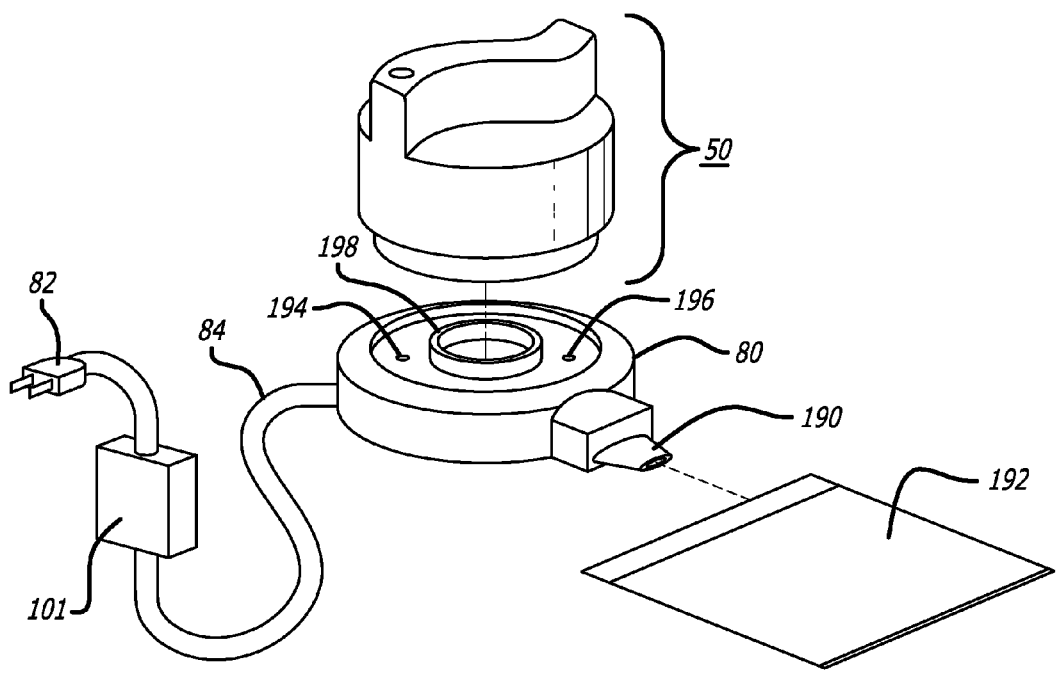
FIG. 5 is a perspective view of the invention with its charging stand.

Referring now to FIG. 5, a charging stand 80, the vacuum producing unit 50, and a zip lock type plastic bag 192 are illustrated. The vacuum producing unit 50 can be inserted into the charging stand 80 to recharge the rechargeable batteries 32 (see FIG. 2) by interfacing with metal contacts 194 and 196. The charging stand 80 plugs into a standard wall outlet by means of line cord 84, AC to DC transformer 101 and plug 82. Alternatively, the charging stand 80 can be plugged into a twelve volt DC system such as provided by a vehicle or boat, for example. Additionally, the charging stand 80 includes a flat plenum 190 that allows the vacuum created by the vacuum unit 50 to be used to remove air from the zip lock type plastic bags 192 before sealing them.

Figure 6:
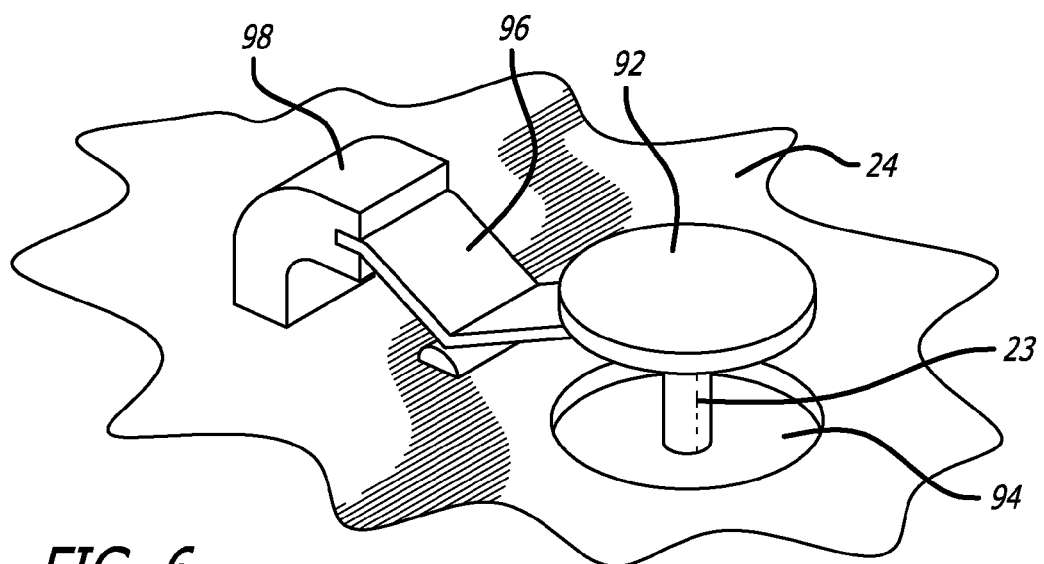
FIG. 6 is a partial perspective view of the vacuum indicating portion
Figure 7:
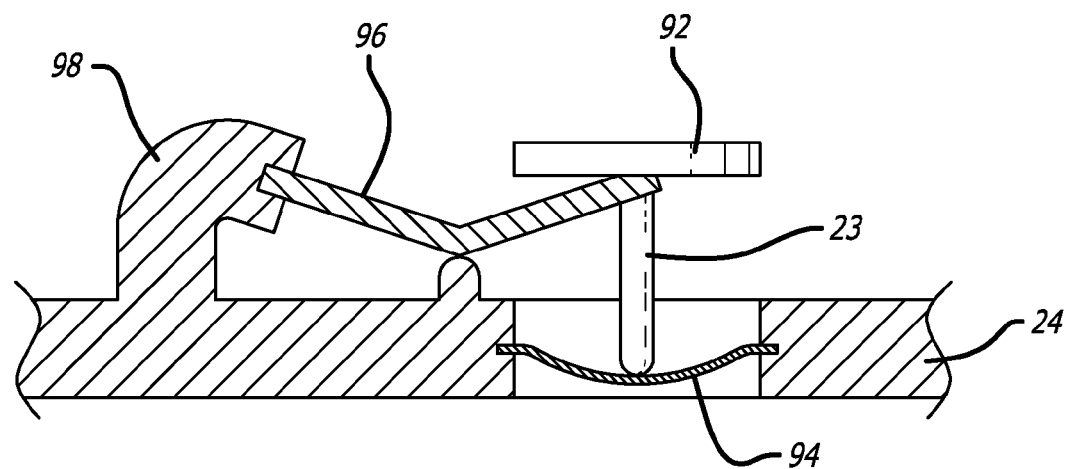
FIG. 7 is a section view of the vacuum indicating portion

Reference is now made to FIGS. 6 and 7. FIG. 6 shows a partial perspective view of the lid 24. FIG. 7 shows a side cross-sectional view of a deformable diaphragm 94 and a metal clicking unit 96. The flexible diaphragm 94 can be depressed when a vacuum is drawn. An attached vertical pin 93 is also drawn in a downward fashion causing thin metal member 96 to bend and ultimately create a clicking noise. Additionally, the top disk 92 is drawn down, giving the user a visual indication that the vacuum is in force.

Figure 9:
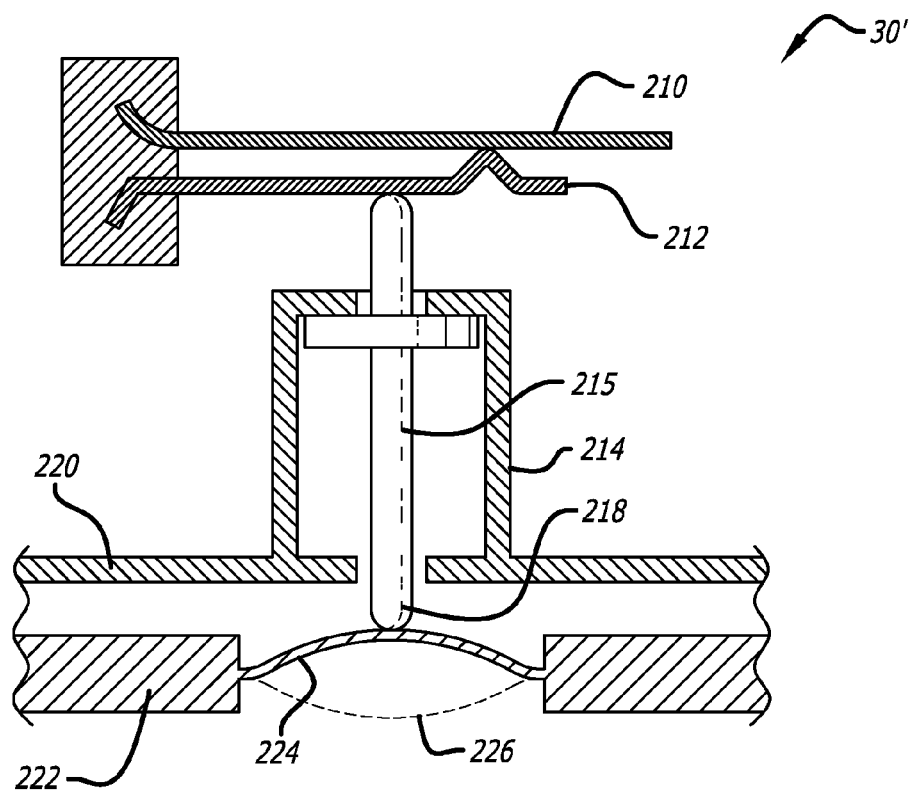
FIG. 9 is a partial section view of an alternate embodiment of the vacuum attachment means.

Referring now to FIG. 9, an alternate embodiment of a vacuum switch 30' is illustrated. In this version, when a vacuum is produced, flexible diaphragm 224 is drawn down as shown by dotted line 226. This causes post 215 to be drawn down thereby causing metal contacts 210, 212 to separate thereby breaking the circuit to the vacuum pump 28.

While the portable vacuum food storage system 100 was shown and described as having a vacuum producing unit 50 and a vacuum storage container assembly 90, in an alternate embodiment of the portable vacuum food storage system, the vacuum producing unit 50, including the vacuum pump 28 and the associated housing 2, is built into the container lid 24.

What is claimed is:

1. A portable vacuum food storage system comprising:
    a container to store food;
    a mating container lid to couple to said container and form an air tight seal;
    a vacuum producing unit including a vacuum housing that contains
        a vacuum pump;
        a vacuum pressure switch to automatically turn off said vacuum pump when a substantial vacuum is reached and to automatically turn on said vacuum pump to replenish said vacuum when it becomes partially depleted;
        a plurality of rechargeable DC batteries; and
        an on off power switch, said on off power switch to selectively couple power from said plurality of rechargeable DC batteries to said vacuum pump through said vacuum pressure switch;
    wherein said vacuum housing having an air tight type fastener located near its lower center portion to mate with a receptacle located on said mating container lid;
    said mating container lid having a vacuum releasing member, the vacuum releasing member to be pressed by a user to relieve a vacuum in said container;
    said vacuum housing capable of resting on said mating container lid in a stable manner so that a vacuum operation can take place unattended by the user.

2. The portable vacuum food storage system as claimed in claim 1 wherein
    the underside of said mating container lid has a plurality of container lip retaining grooves so that one lid can fit a variety of sizes of containers in an air tight fashion.

3. The portable vacuum food storage system as claimed in claim 1 wherein
    said mating container lid includes a flexible portion that depresses as said vacuum is pulled thereby giving the user a visual aid to see that said vacuum is present in said container.

4. The portable vacuum food storage system as claimed in claim 1 wherein
    said mating container lid is rectangularly shaped to fit over rectangularly shaped containers.

5. The portable vacuum food storage system as claimed in claim 1, wherein
    said air tight type fastener of said vacuum housing is a bayonet type fitting to twist and fasten said vacuum housing onto said mating container lid.

6. The portable vacuum food storage system as claimed in claim 5, wherein
    a top of said vacuum housing having a gripping means to twist and fasten said vacuum housing onto said mating container lid.

7. A portable vacuum food storage system comprising:
    a housing containing
        a vacuum pump;
        an on off power switch;
        a vacuum pressure switch;
        a plurality of rechargeable DC batteries; and wherein
        said housing having an air tight type fastener located near its lower center portion to mate with a receptacle located on a container lid;
    said housing capable of resting on said container lid in a stable manner so that a vacuum operation can take place unattended by the user; and
    said container lid includes
        a flexible portion that depresses as a vacuum is developed in a container thereby giving the user a visual aid to see that said vacuum is present in said container,
        a thin metallic member that is in close contact with said flexible portion in said container lid so that when said flexible portion is depressed completely by said vacuum, a clicking noise is created by said thin metallic member, and
        a vacuum releasing member to be pressed by a user to relieve said vacuum in said container.

8. The portable vacuum food storage system as claimed in claim 7 wherein
    said vacuum pump and said housing are built into said container lid.

9. A portable vacuum food storage system comprising
    a vacuum producing unit including a housing containing
        a vacuum pump,
        an on off power switch,
        a vacuum pressure switch, and
        a plurality of rechargeable batteries;
    a recharging stand into which the vacuum producing unit can plug to recharge the plurality of rechargeable batteries,
the recharging stand including a horizontally extended plenum to connect with the housing of said vacuum producing unit when plugged in so that the horizontally extended plenum can evacuate air from a plastic bag coupled thereto.

* * * * *